March 31, 1959 B. FIELD 2,880,319

HIGH FREQUENCY COMPENSATING MATRIX NETWORK

Filed April 22, 1957

INVENTOR:
BORIS FIELD,
BY Donald N. Timbie
HIS ATTORNEY.

United States Patent Office 2,880,319

Patented Mar. 31, 1959

2,880,319

HIGH FREQUENCY COMPENSATING MATRIX NETWORK

Boris Field, Syracuse, N.Y., assignor to General Electric Company, a corporation of New York Application April 22, 1957, Serial No. 654,217

11 Claims. (Cl. 250—27)

Figure 1:
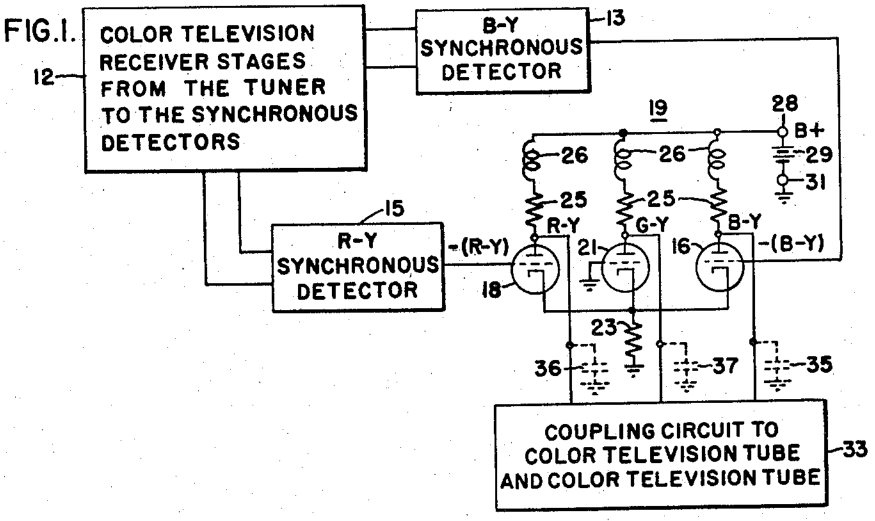

The present invention relates to a matrix network that enhances the high frequency video signals in television systems.

Color television information is contained in four signals: a brightness or monochrome signal Y, a green signal G, a blue signal B, and a red signal R. The relationship between these signals is $$Y=0.59G+0.30R+0.11B$$

Due to this relationship it is not necessary to transmit all four signals separately, and in practice only the Y signal is separate. In addition to the transmitted Y signal there are two other transmitted signals one of which is a combination of R and Y and the other of which is a combination of B and Y.

In most color television receivers there are two circuits called synchronous detectors. One of these circuits operates on the processed received signal to produce an output of positive or negative $R-Y$ and the other operates on the processed received signal to produce an output of positive or negative $B-Y$. Only $-(R-Y)$ and $-(B-Y)$ are referred to in the following discussion, but it is to be realized that positive signals could have been considered as well. It can be shown through the above-mentioned relationship that $-(R-Y)$ and $-(B-Y)$ can be combined to produce a signal $G-Y$. The network that does this combining is called a matrix network. Besides producing the $G-Y$ signal the matrix network also inverts the other two signals to $R-Y$ and $B-Y$. Thus, the output from the matrix comprises three signals: $G-Y$, $B-Y$, and $R-Y$. These three signals are conducted to a network that adds the brightness signal Y to each thereby producing G, B, and R signals. The G, B, and R signals are then conducted to respective input electrodes in the color tube.

One type of matrix network comprises three amplifier tubes having a common cathode load resistor (this type matrix network will be hereinafter referred to as a common electrode-load matrix). The $-(R-Y)$ output from one of the synchronous detectors is conducted to the grid of one of these tubes and the $-(B-Y)$ output from the other synchronous detector is conducted to the grid of another one of these tubes. The plate outputs from these two tubes are $R-Y$ and $B-Y$, respectively, due to the inversion caused by the tubes. The grid of the third tube is grounded so that the tube acts as a grounded-grid amplifier, amplifying the voltage appearing across the common load resistor. It can be shown that if this resistor has the correct value, the voltage appearing at the cathode of the grounded-grid amplifier is such that a $G-Y$ output appears at the plate of this tube.

The high frequency components of the $G-Y$, $B-Y$, and $R-Y$ outputs from the matrix must be enhanced as compared to the low frequency components if the proper amplitude relationship between the high and low frequency components is to be maintained. This enhancement is necessary because the shunt capacities of the circuits that the outputs of the matrix energize are of sufficient value to produce a much lower reactance for the high frequency components than for the low frequency components. This difference in reactance produces a difference in amplitude for the two frequency range of components. That is, the amplitudes of the high frequency components are lowered considerably although the amplitudes of the low frequency components are not appreciably affected. To eliminate this unbalance in amplitudes it is necessary to insert a circuit that enhances only the high frequency signals so that when they are attenuated by the shunt capacity reactance their attenuated amplitudes are at the levels they would have been at had there been no shunt capacity and no enhancing or compensating network.

Accordingly, one object of the present invention is to provide a common electrode-load matrix that has high frequency compensation.

One conventional frequency compensation circuit comprises chokes placed in the amplifier plate circuits of the matrix network. The values of the chokes are selected so that at a high frequency the chokes are series resonant with the input capacities of the circuits that are energized by the matrix output. It can be shown that with this arrangement there are large increases in voltage across these chokes only for the high frequencies. Because the increases in voltage are in the plate circuits, these increases also appear in the outputs. The disadvantage of this type frequency compensation is, that it is not sufficient because the necessary plate resistors damp the resonant action and thereby limit the increase in amplitude of the high frequency components of the video signal.

Therefore, another object of the present invention is the provision of a common electrode-load matrix that has sufficient high frequency compensation.

Some degree of compensation can also be obtained by the insertion of a small capacitor across the common electrode-load resistor. At low frequencies this capacitor has a high reactance and thus is of no practical effect. Therefore, the low frequency voltages appearing across the load resistor have a degenerative action on the amplifying action of the tubes. That is, these tubes do not amplify the low frequencies as much as they would have, had the resistor not been present or had it been adequately bypassed. Because at high frequencies this capacitor is a virtual short, no appreciable amplitudes of the high frequency voltages appear across this resistor. Consequently, there is no degenerative action in the tubes for these high frequencies. Therefore, the high frequency components are enhanced because they are amplified more than the low frequency components.

One of the disadvantages of the capacitor type compensation circuit is that because the high frequencies are bypassed by the capacitor they do not energize the cathode of the grounded-grid amplifier. Without these high frequencies, a proper $G-Y$ signal is not produced at the plate of the grounded-grid amplifier. In other words, the high frequencies of the $G-Y$ signal are severely attenuated rather than enhanced.

Thus, a further object of the present invention is to provide a common electrode-load matrix that provides enhancement of the high frequencies for all three of the color signals.

Another disadvantage of the capacitor compensator is that it does not provide a high frequency sharp cut-off. There are many high frequencies that, if passed, will distort the color pattern. Thus, it would be advantageous if they were attenuated by some kind of low-pass filter action.

Therefore, still another object is to provide a high frequency compensated matrix network that provides low-pass filter action.

Briefly stated, in carrying out my invention in one form, I provide a series resonant circuit in parallel with the load impedance of a common electrode-load matrix network. This resonant circuit is tuned to be a virtual short-circuit for the high frequency components. Thus, for these components there is no degenerative action in the tubes energized by the synchronous detectors. At the low frequencies, however, there is degenerative action in these tubes because this series resonant circuit is not a short across the load impedance. Therefore, in the tubes energized by the synchronous detectors, the high frequency components are amplified to a greater degree than the low frequency components. The cathode of the other tube, the grounded-grid amplifier, is joined to an intermediate point of the series resonant circuit. For example, if the series resonant circuit comprises a lumped capacitor in series with a lumped inductor, the cathode can be joined at the junction between the capacitor and inductor. With this connection the high frequency components appearing on the cathode are enhanced because voltages of frequencies near the resonant frequency of a series resonant circuit appear across both the inductor and the capacitor with a much greater amplitude than the corresponding applied voltages are across the series combination of inductor and capacitor. Thus, the high frequency components in the $G-Y$ signal appearing on the plate are enhanced because they are enhanced on the cathode. Therefore, in all three outputs from the matrix network there is enhancement of the high frequency components.

In regards to high frequency cut off, it is well known that through suitable selection of the capacitance and the inductance of a series resonant circuit a very sharp dip in the impedance curve can be obtained. In other words the impedance of the resonant circuit can be made to sharply increase for frequencies higher than the highest frequency that is to be enhanced. This increase in impedance eliminates the enhancement action of the series resonant circuit. Without enhancement these undesirable high frequency waves are attenuated to insignificant values by the shunt capacitance of the circuits energized by the matrix network.

Figure 2:
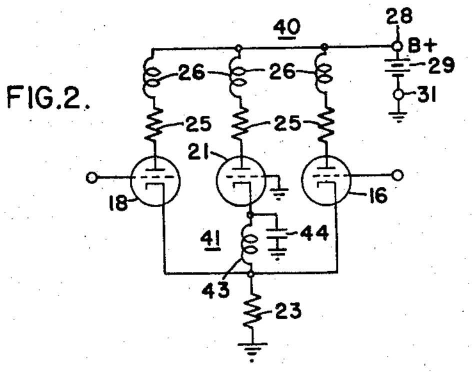

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which:

Fig. 1 is a combination block and detailed circuit diagram of a color television receiver in which a conventional common-electrode type matrix network is shown in detail, Fig. 2 is a preferred embodiment of the matrix network of my invention, and Figs. 3A through 3E are curves of impedance vs. frequency for various impedance arrangements.

In Fig. 1, block 12 indicates the circuits in a color television receiver that precede the synchronous detectors; i.e. block 12 includes the tuner, I.F. stages, etc. A synchronous detector 13, energized by signals from the earlier stages, produces an output $-(B-Y)$. Similarly, a synchronous detector 15 produces an output $-(R-Y)$. Suitable circuits for synchronous detectors 13 and 15 and the prior stages are not shown because they are well known to those skilled in the art. The $-(B-Y)$ and $-(R-Y)$ signals energize inputs to two electron discharge devices 16 and 18, respectively, of a common electrode-load matrix network 19. I use the term "electron discharge device" to refer to the active element of an amplifier. The electron discharge devices 16 and 18 and a third electron discharge device 21 of network 19 are shown to be tubes, but it should be apparent that they could as well be transistors or another type of device capable of producing amplification when connected in a suitable circuit. Similar electrodes, herein shown to be cathodes, of the three tubes 16, 18, and 21 are joined to one terminal of a load resistor 23. The other terminal of this resistor is connected to a source of constant potential that is denoted as ground. Also shown connected to ground is the grid of tube 21. Each of the plate circuits of the three tubes 16, 18, and 21 has a plate resistor 25 across which the output voltage is developed and a choke 26 that provides a limited amount of frequency compensation. One end of each of the chokes 26 is joined to the positive terminal 28 of a source of fixed potential 29. The other terminal 31 of this source of fixed potential is connected through ground to the grid of tube 21 and to one end of resistor 23. The plates of tubes 16, 18, and 21 are joined to the input of block 33. This block designates the coupling circuits and conversion circuits for converting the output signals from matrix 19 into suitable forms for energizing the input electrodes of the color television tube. I have not shown the circuits of block 33 in detail because suitable circuits for this block are well known to those skilled in the art. The shunt capacities of the coupling circuits and the color television tube that load the outputs from tubes 16, 18, and 21 are represented by phantom capacitors 35, 36, and 37, respectively.

In the operation of the matrix 19 of Fig. 1, the $-(R-Y)$ voltage from detector 15 is inverted by discharge device 18 to a voltage $R-Y$. Similarly, the voltage $-(B-Y)$ voltage from detector 13 is inverted by discharge device 16 to a voltage $B-Y$. The variations of currents in discharge devices 16 and 18 caused by the inputs $-(B-Y)$ and $-(R-Y)$, respectively, produce voltages across load resistor 23 the combined effect of which is to produce a $G-Y$ variation at the cathode of discharge device 21. Device 21 amplifies the $G-Y$ cathode voltage to produce a $G-Y$ voltage on its plate of proper relative magnitude as compared to the voltages $B-Y$ and $R-Y$ on the plates of devices 16 and 18, respectively.

Due to the shunt capacities 35, 36, and 37, the high frequency components of the three outputs from matrix 19 that energize the input electrodes of the color tube have a smaller amplitude with respect to the low frequency components than they should have. To eliminate this unbalance a compensating network should be included that enhances the high frequency components so that when they reach the input electrodes of the color tubes, they have the amplitudes they would have had, had there been no shunt capacity and no compensation.

As previously mentioned, chokes 26 provide some frequency compensation. The values of inductance for these chokes are selected so that, at a frequency high in the video pass-band they resonate with the input shunt capacities 35, 36, and 37. Thus, the frequencies near the resonant frequency, i.e. the high frequency components of the video signal, are enhanced somewhat by the "resonant build-up" across inductors 26. This "build-up" will be explained in the discussion of the operation of the Fig. 2 matrix. The amount of frequency compensation obtained by means of these chokes is insufficient due to the presence of the resistors 25. These resistors dampen the resonant action and thus decrease the "build-up." Additional, more effective compensation is needed.

Fig. 2 shows a preferred embodiment of the matrix of my invention that provides such additional compensation. The corresponding components of the matrix 40 of Fig. 2 and of the matrix 19 of Fig. 1 have the same designating numerals. Matrix 40 differs from matrix 19 in the addition of a series resonant circuit 41 in parallel with load resistor 23. It also differs in the connection of the cathode of device 21 to an intermediate point of circuit 41 rather than to an end of resistor 23. Although resonant circuit 41 is shown to comprise an inductor 43 connected in series with a capacitor 44, this circuit can be constructed from other components. For example, in some applications it could comprise a transmission line. Also, it is not necessary that the cathode of device 21 connect at the junction between inductor 43 and capacitor 44. This cathode could be connected to an intermediate point on inductor 43. It is preferable, however, to have the inductor 43 rather than the capacitor 44 joined between resistor 23 and the cathode of device 21 because this inductor provides a D.C. path for the D.C. component of the $G-Y$ signal. Of course, capacitor 44 would block the D.C. component. Series resonant circuit 41 is preferably tuned to a frequency that is high in the video band so that it presents a very low impedance for the high frequency video components.

In the operation of matrix 40, device 18 amplifies the high frequency components of the $R-Y$ signal more than the low frequency components. This difference in amplification is due to degenerative feedback developed across resistor 23 for the low frequency components that is not present for the high frequency components. For the low frequency components the reactance of capacitor 44 of circuit 41 is quite high. Thus, the reactance of circuit 41 is high and it has practically no shunting effect across resistor 23. However, for the high frequency components that are near the resonant frequency of circuit 41 the combined effects of the reactances of inductor 43 and capacitor 44 produce a very low impedance path across resistor 23. With this small impedance only a very small, relatively ineffective, degenerative voltage is produced across the parallel combination of resistor 23 and circuit 41. This same analysis holds true for the high and low frequency components in the $B-Y$ output from device 16.

The effect of resonant circuit 41 upon device 21 is entirely different from its effect on devices 16 and 18. Circuit 41 increases the high frequency components on the cathode of device 21 instead of diminishing them. As previously stated, the amplitudes of the high frequency components of $-(B-Y)$ and $-(R-Y)$ are quite low across resonant circuit 41 and thus it might at first seem that these amplitudes are low at the cathode of device 21. But it is characteristic of series resonant circuits that the amplitudes of the frequencies near the resonant frequency are quite large across either the inductor or the capacitor even though the amplitudes of these frequencies across the resonant circuit is low. In fact if inductor 43 were a pure inductance and capacitor 44 were a pure capacitance it could be shown that the amplitudes of these high frequency components across the inductor or capacitor are incalculably high. This phenomenon is commonly referred to as "resonant build-up." From the above explanation it is evident that the voltage across capacitor 44, which is the input voltage to device 21, is quite large. However, this input voltage is relatively small for the low frequency components because there is no "resonant build-up" at the low frequencies. Thus, only the high frequency components are enhanced at the cathode of device 21. They are likewise enhanced at the plate because device 21 amplifies the cathode voltages of all frequencies within the video band approximately the same.

Matrix network 40 provides a sharp cut-off feature in addition to the enhancement of the high frequency components of the three signals $G-Y$, $B-Y$, and $R-Y$. This sharp cut-off feature is important because there are distorting signals having frequencies near 3.58 megacycles that should not be enhanced. Through suitable choice of the ratio of the value of inductance L of inductor 43 to the value of capacitance C of capacitor 44, a sharp cut-off can be obtained that substantially eliminates these distorting signals. How resonant circuit 41 performs this sharp cut-off feature can be understood from a consideration of the graphs of Figs. 3A through 3E.

Figure 3A:
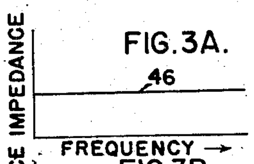

Fig. 3A is a graph of impedance vs. frequency for load resistor 23. As can be noted from the straight horizontal line 46, resistor 23 has a constant impedance for all frequencies.

Figure 3B:
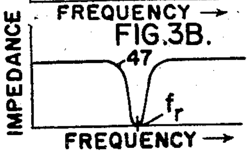

Fig. 3B is a graph of the impedance of resonant circuit 41 for values of inductance L of inductor 43 and of capacitance C of capacitor 44 such that the ratio $L/C$ is high. A different but equivalent way of expressing this last statement is to say that this curve 47 is the curve obtained when the values of inductance L and capacitance C are selected to make the Q of circuit 41 quite high. As is well known the Q of a circuit varies directly with inductance L and inversely with capacitance C. Thus, if L is increased and C decreased the Q is increased. Of course when L is increased and C decreased the ratio of $L/C$ is increased. It should be apparent from the resonant frequency equation $$f_r=\frac{1}{2\Pi\sqrt{LC}}$$

(wherein $f_r$ is the resonant frequency of circuit 41) that L can be increased and C decreased without any change in the resonant frequency $f_r$. The principal feature of interest of curve 47 is the sharp increase in impedance just to the right of $f_r$.

Figure 3C:
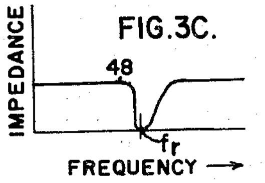

In Fig. 3C curve 48 is a graph of the parallel impedance combination of resistor 33 and resonant circuit 41 when this circuit has a high Q. The decrease in impedance at $f_r$, as previously explained, provides enhancement of the high frequencies near $f_r$. The sharp increase in impedance to the right of $f_r$—the high frequency side of $f_r$—provides the sharp cut-off feature for high frequencies beyond $f_r$. This high impedance to the right of $f_r$ causes degenerative voltages to appear at the cathodes of devices 16 and 18 and thus there is a decrease in amplification for these high frequency waves in these tubes as there was for the low frequency components. In addition these high frequency waves are severely attenuated by shunt capacities 35 and 36. The combined effect of the degeneration and the attenuation lowers the amplitudes of these high frequency components to insignificant values. As regards the high frequency components in tube 21, the sharp increase in impedance of the resonant circuit 41 to the right of $f_r$ produces a sharp decrease in current in circuit 41 for these high frequency signals. This decrease in current coupled with a decrease in reactance of capacitor 44 produces a sharp decrease in the amplitude of the input voltages to tube 21 for these high frequencies. Of course tube 21 amplifies these high frequency waves by approximately the same amount as the low frequency signals. But the input amplitudes of these high frequency waves are so low in comparison to the input amplitudes of the lower frequency components that at the plate of tube 21 the amplitudes of the high frequency waves are insignificant as compared to the amplitudes of the lower frequency components. In addition shunt capacity 37 attenuates the high frequency waves more than the lower frequency components. Thus, the amplitudes of these high frequency distorting waves are insignificant at the input of the color television tube.

Figure 3D:
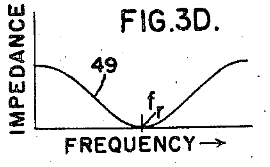

In Fig. 3D, curve 49 is the impedance vs. frequency response of circuit 41 when the values of inductance L and capacitance C for circuit 41 are such as to produce a low ratio of $L/C$, or, in other words, such as to produce a low Q circuit. It should be noted that to the right of $f_r$, curve 49 gradually increases in amplitude in contrast to the sharp increase for curve 47.

Figure 3E:
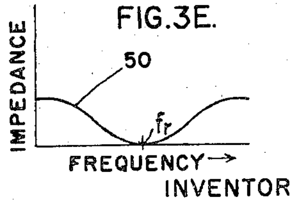

Fig. 3E is a graph of the parallel impedance combination of resistor 33 and resonant circuit 41 when the latter is a low Q circuit. The curve 50 of Fig. 3E, of $f_r$, increases only gradually in amplitude to the right of $f_r$. Thus, if a low Q resonant circuit is used there will be some enhancement for the high frequency waves in tubes 16 and 18 in this gradually increasing range because the degenerative voltage developed across resistor 33 and resonant circuit 41 will be smaller for these high frequency waves than they would be had the impedance of circuit 41 been greater. Also, there will be enhancement of these high frequencies in tube 21 because the current through the resonant circuit 41 and thus the input voltages across capacitor 44 will be greater for these frequencies than they would have been had the impedance of circuit 41 been greater. Of course, enhancement of these high frequency distorting waves should be avoided. Thus, it is desirable to select values of L and C for inductor 43 and capacitor 44, respectively, such that the sharp cut-off feature is obtained.

Although the invention has been described by reference to a particular embodiment thereof, it will be understood that numerous modifications can be made by those skilled in the art without departing from the invention. I therefore, aim in the appended claims to cover all such equivalent variations as come within the true spirit and scope of my invention.

What I claim as new and desire to secure by Letters Patent of the United States is:

1. A network for matrixing a plurality of input video signals and for enhancing the high frequency components of said input video signals, said network comprising: a plurality of amplifiers, each containing an electron discharge device; an impedance element connected as a common load for similar electrodes of all but one of said discharge devices; a series resonant circuit connected in parallel with said impedance element; and a connection between an intermediate point of said series resonant circuit and the electrode of said one electron device which electrode is similar to said similar electrodes.

2. The network as defined in claim 1 wherein said series resonant circuit comprises a lumped inductor connected in series with a lumped capacitor such that one end of said inductor is connected to said similar electrodes and wherein said similar electrode of said one electron discharge device is connected to the junction between said inductor and said capacitor.

3. The network as defined in claim 2 wherein said plurality of electron discharge devices comprises a plurality of electron tubes and wherein said similar electrodes are the cathodes of said plurality of tubes.

4. The network as defined in claim 3 wherein the values of inductance and capacitance are such that said series resonant circuit is resonant at a frequency that is near the upper end of the video pass band.

5. The network as defined in claim 4 wherein the ratio of values of inductance to capacitance of said series resonant circuit is such that the impedance of said resonant circuit increases sharply at frequencies that are close to the resonant frequency of said resonant circuit.

6. A network for matrixing a plurality of input video signals and for enhancing the high frequency components of said input video signals, said network comprising: a first and second amplifier wherein both of said amplifiers contain an electron discharge device; a load impedance connected to an electrode of the electron discharge device in said first amplifier; a series resonant circuit connected in parallel with said load impedance; and a connection between an electrode of the electron discharge device in said second amplifier and an intermediate point of said series resonant circuit.

7. The network as defined in claim 6 wherein said electron discharge devices in both amplifiers comprise tubes and wherein said electrodes of said electron discharge devices are cathodes of said tubes.

8. The network as defined in claim 7 wherein the values of inductance and capacitance of said series resonant circuit are such that said circuit is resonant at a frequency that is near the upper end of the video pass band, and wherein the ratio of values of inductance to capacitance is such that the impedance of said series resonant circuit increases sharply from the resonant impedance value at frequencies that are close to the resonant frequency of said resonant circuit.

9. A network comprising: a plurality of amplifiers wherein one of said plurality of amplifiers is a grounded-grid amplifier; a common load impedance connected in the circuits of all of said plurality of amplifiers, except said grounded-grid amplifier, in a manner such that a degenerative voltage is developed across said load impedance; a series resonant circuit connected in parallel with said load impedance; and a connection between the input of said grounded-grid amplifier and an intermediate point of said series resonant circuit.

10. A matrix network comprising: first, second, and third electron tubes, each having a grid, cathode, and plate; a source of fixed potential having a positive terminal and a negative terminal; a plate load connected between the plate of each of said electron tubes and the positive terminal of said source of fixed potential; a resistor connected between the cathodes of said first and second electron tubes and the negative terminal of said source of fixed potential; a series resonant circuit comprising an inductor and capacitor; leads for connecting said resonant circuit in parallel with said resistor such that one end of said inductor is connected to said cathodes; a connection between the junction of said inductor and capacitor of said series resonant circuit and the cathode of said third electron tube; and a connection between the grid of said third electron tube and the negative terminal of said source of fixed potential.

11. A network for matrixing a first and a second input color signal to produce a third color signal, and for enhancing the high frequency components of all three color signals, said network comprising in combination: a first amplifier for amplifying said first input color signal; a second amplifier for amplifying said second input color signal; a common load impedance connected in the circuits of said first and second amplifiers such that the voltage of the frequencies developed across this impedance comprise said third color signal and such that said voltages have a degenerative effect on the amplification of these frequencies in said first and second amplifier; a series resonant circuit tuned to a frequency high in the bands of said color signals; leads for connecting this resonant circuit in parallel with said load impedance; a grounded-grid amplifier for amplifying said third color signal; and a connection between the input of said grounded-grid amplifier and an intermediate point of said series resonant circuit.

References Cited in the file of this patent

UNITED STATES PATENTS 2,789,156 Arneson ---------------- Apr. 16, 1957

OTHER REFERENCES

Hazeltine Laboratories Staff, "Principles of Color Television," 1956, Wiley and Sons Inc., page 413, Figures 15–18.